(12) United States Patent
Suzuki

(10) Patent No.: US 8,651,712 B2
(45) Date of Patent: Feb. 18, 2014

(54) VEHICLE HEADLAMP AND VEHICLE HEADLAMP DEVICE

(71) Applicant: Ichikoh Industries, Ltd., Isehara (JP)

(72) Inventor: Yasufumi Suzuki, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 0 days.

(21) Appl. No.: 13/754,276

(22) Filed: Jan. 30, 2013

(65) Prior Publication Data

US 2013/0201713 A1    Aug. 8, 2013

(30) Foreign Application Priority Data

Feb. 2, 2012    (JP) ................. 2012-020869

(51) Int. Cl.
   *B60Q 1/00*    (2006.01)
   *B60Q 1/115*    (2006.01)

(52) U.S. Cl.
   USPC ............................ 362/466; 362/523; 362/545

(58) Field of Classification Search
   USPC ......... 362/464–467, 516, 523, 538, 543–545, 362/287, 427
   See application file for complete search history.

(56) References Cited

U.S. PATENT DOCUMENTS

| 7,896,512 B2 | 3/2011 | Tatara et al. |
| 2007/0025117 A1* | 2/2007 | Watanabe et al. ............. 362/545 |
| 2009/0086500 A1 | 4/2009 | Tatara et al. |

FOREIGN PATENT DOCUMENTS

JP    2009-087811 A    4/2009

* cited by examiner

*Primary Examiner* — Thomas Sember

(74) *Attorney, Agent, or Firm* — Foley & Lardner LLP

(57) ABSTRACT

The present invention provides a lamp unit for low beam, a lamp unit for high beam, and a lamp unit for shoulder edge beam. The lamp units each are made of a semiconductor-type light source and a reflector that has reflection surfaces configured to illuminate the light from the semiconductor-type light source forward of a vehicle, as a predetermined light distribution pattern. As a result, the present invention is capable of fully utilizing the light from the semiconductor-type light source, making it possible to facilitate a light distribution design configured to form the light in a predetermined light distribution pattern.

4 Claims, 10 Drawing Sheets

VEHICLE HEADLAMP AND VEHICLE HEADLAMP DEVICE

CROSS REFERENCE TO RELATED APPLICATIONS

This application claims priority of Japanese Patent Application No. 2012-020869 filed on Feb. 2, 2012. The contents of the application are incorporated herein by reference in their entirety.

BACKGROUND OF THE INVENTION

1. Field of the Invention

The present invention relates to a vehicle headlamp configured to illuminate a multifunctional light distribution patterns forward of a vehicle. In addition, the present invention relates to a vehicle headlamp device that is provided with a vehicle headlamp configured to illuminate multifunctional light distribution patterns forward of a vehicle.

2. Description of the Related Art

A vehicle headlamp and a vehicle headlamp device of such a type (hereinafter, referred to as a "vehicle headlamp system) are conventionally known (for example, Japanese Unexamined Patent Application Publication No. 2009-87811). Hereinafter, a conventional vehicle headlamp system will be described. The conventional vehicle headlamp system is provided with: a main lamp unit; a projector type first subsidiary lamp unit of a projector type; and a second subsidiary lamp unit of a lens direct emission and light distribution type, each of which employs a semiconductor light emitting element as a light source. Multifunctional light distribution patterns can be obtained by turning on or off the light source of the main lamp unit, turning on or off the semiconductor light emitting element that serves as the first subsidiary lamp unit or turning on or off the semiconductor light emitting element that serves as the second lamp unit.

However, the conventional vehicle headlamp system described previously uses the first subsidiary lamp unit of the projector type; and therefore, there has been a case in which light from the semiconductor light emitting element is reflected on a reflection surface of a reflector and then shaded by means of a base member when the reflected light substantially converges in proximity to a focal point on a rear side of a projection lens. Therefore, there has been a case in which the light from the semiconductor light emitting element cannot be fully utilized. In addition, the conventional vehicle headlamp system described previously uses the second subsidiary lamp unit of the lens direct emission and light distribution type; and therefore, a light distribution design configured to form the light from the semiconductor light emitting element in a predetermined light distribution pattern by means of the projection lens is prone to be cumbersome.

SUMMARY OF THE INVENTION

The present invention has been made in order to the above described problem that there has been the case in which the light from the semiconductor light emitting element is not fully utilized, and the light distribution design configured to form the emitted light in the predetermined light distribution pattern is prone to be cumbersome in conventional vehicle headlamp systems.

A vehicle headlamp according to first aspect of the present invention comprising:

a lamp unit for low beam configured to illuminate a light distribution pattern for low beam forward of a vehicle;

a lamp unit for high beam configured to illuminate a light distribution pattern for high beam forward of the vehicle; and a lamp unit for shoulder edge beam configured to a light distribution pattern for shoulder edge beam forward of the vehicle, wherein the lamp unit for low beam, the lamp unit for high beam, and the lamp unit for shoulder edge beam each are made of a semiconductor-type light source and a reflector having a reflection surface configured to illuminate light from the semiconductor-type light source forward of the vehicle, as the light distribution pattern for low beam, the light distribution pattern for high beam, and the light distribution pattern for shoulder edge beam.

The vehicle headlamp according to second aspect of the present invention, in the first aspect wherein, the lamp unit for low beam, the lamp unit for high beam, and the lamp unit for shoulder edge beam are configured so as to be integrated with each other and to be rotatable around a vertical shaft by means of a swivel device.

The vehicle headlamp according to third aspect of the present invention, in the second aspect, wherein, a vertical shaft of the swivel device passes through a center or a substantial center of the lamp unit for low beam.

A vehicle headlamp device according to fourth aspect of the present invention comprising:

a vehicle headlamp according to the first aspect to third aspect;

a detecting portion configured to detect whether or not a preceding vehicle or an opposite vehicle exists; and a control portion configured to output a control signal to a semiconductor-type light source or the semiconductor-type light source and a swivel device, based on a detection signal from the detecting portion.

The vehicle headlamp according to the first aspect of the present invention uses lamp units of a reflector reflection and light distribution type as a lamp unit for low beam, a lamp unit for high beam, and a lamp unit for shoulder edge beam. Therefore, light from a semiconductor-type light source can be fully effectively utilized in comparison with a lamp unit of a projector type. In addition, a light distribution design configured to form the light from the semiconductor-type light source in a predetermined light distribution pattern by means of a reflection surface of a reflector is simplified in comparison with a lamp unit of a lens direct emission and light distribution type.

Moreover, the vehicle headlamp according to the first aspect of the present invention is provided in such a manner that multifunctional light distribution patterns can be obtained by turning on or off the semiconductor-type light source of the lamp unit for low beam, turning on or off the semiconductor-type light source of the lamp unit for high beam or turning on or off the semiconductor-type light source of the lamp unit for shoulder edge beam.

The vehicle headlamp according to the second aspect of the present invention is provided in such a manner that multifunctional light distribution patterns can be distributed in a horizontal direction (in a transverse direction) by means of a swivel device; and therefore, further multifunctional light distribution patterns can he obtained. In particular, a light distribution pattern for low beam can be distributed in a horizontal direction; and therefore, a visual recognition property in a swivel direction at the time of driving on a curved route (a curve) can be enhanced, making it possible to contribute to safe driving.

The vehicle headlamp according to the third aspect of the present invention is provided in such a manner that a vertical shaft of a swivel device passes through a center or a substantial center of a lamp unit for low beam; and therefore, when a light distribution pattern is distributed in a horizontal direction by means of the swivel device, deformation of the light distribution pattern for low beam can be reduced to its required minimum level.

The vehicle headlamp device according to the fourth aspect of the present invention is provided in such a manner that by means for solving the problem described previously, advantageous effects that are similar to those of the vehicle headlamp according to any one of the first to third aspects of the present invention that precede can be achieved.

DESCRIPTION OF THE PREFERRED EMBODIMENTS

Figure 2:
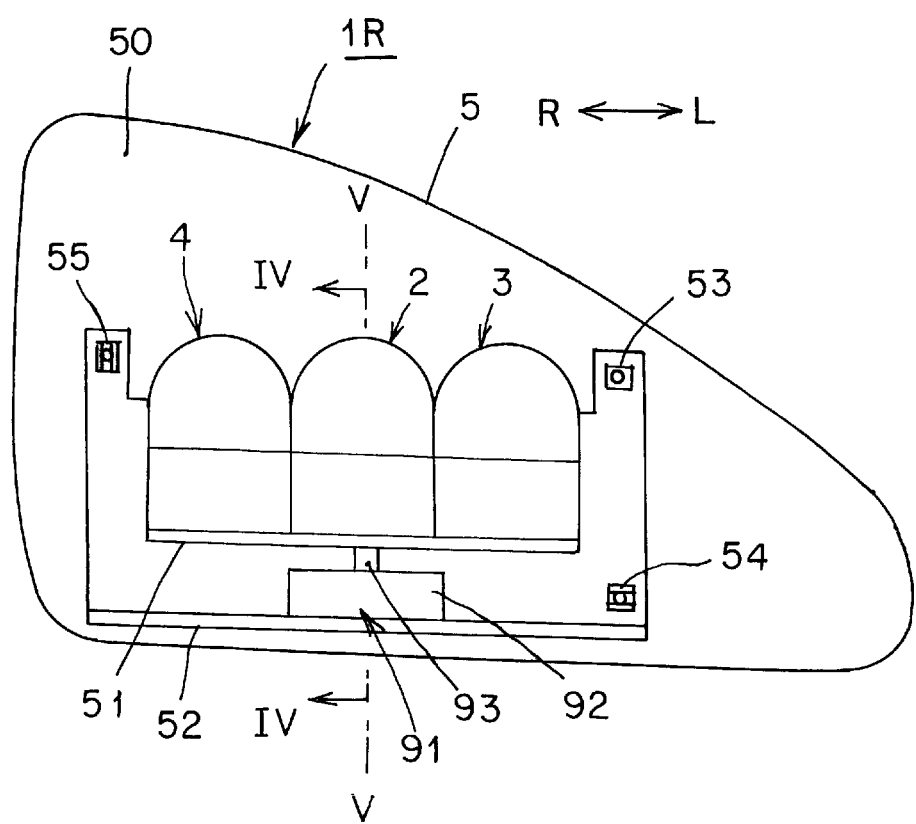
FIG. 2 is a front view showing the essential constituent elements of a right side lamp unit.
Figure 3:
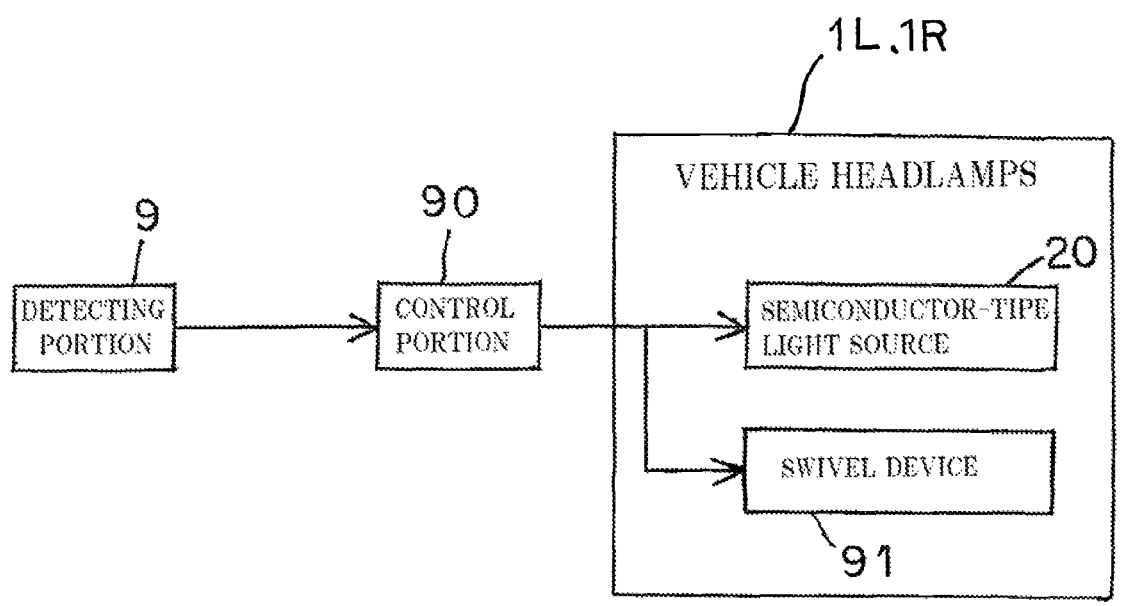
FIG. 3 is a block diagram depicting the constituent elements of a vehicle headlamp device.

Hereinafter, two examples of the preferred embodiments (exemplary embodiments) of a vehicle headlamp system according to the present invention will be described in detail with reference to the drawings. It is to be noted that the present invention is not limited by the embodiments. In FIG. 2, reference code R designates a right side, and reference code L designates a left side, respectively. In FIG. 5 to FIG. 9, reference code VU-VD designates a vertical line from the top to bottom of a screen. Reference code HL-HR designates a horizontal line from the left to right of the screen. In the present specification and the claimed attached herewith, the terms "front" "rear", "top", "bottom", "left", and "right" respectively designate the front, rear, top, bottom, left, and right to be defined when the vehicle headlamp according to the present invention is mounted on a vehicle.

Description of Configuration of First Embodiment

Figure 1:
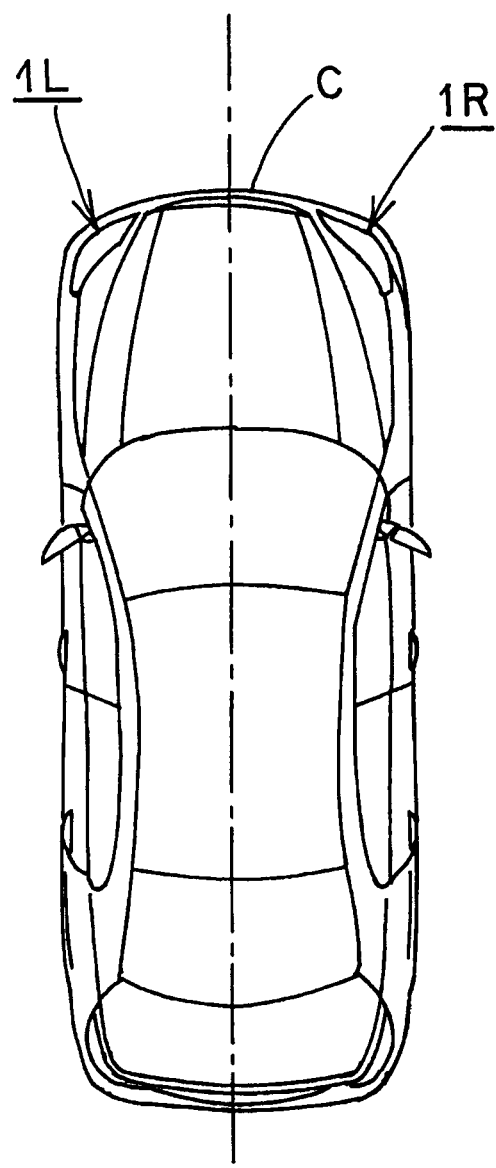
FIG. 1 shows a first embodiment of a vehicle headlamp system according to the present invention, and a plan view of a vehicle having vehicle headlamps mounted on both of the left and right sides of the vehicle.

Each of FIG. 1 to FIG. 14 shows a first embodiment of a vehicle headlamp system according to the present invention. Hereinafter, a configuration of the vehicle headlamp system according to the first embodiment will be described. In FIG. 1, reference numerals 1L and 1R designate vehicle headlamps according to the first embodiment (such as headlamps, for example). The vehicle headlamps 1L and 1R are mounted on both of the left and right end parts of a front portion of a vehicle C for left side driving). Hereinafter, a right side vehicle headlamp 1R to be mounted on the right side of the vehicle C will be described. It is to be noted that the left side vehicle headlamp 1L to be mounted on the left side of the vehicle C is made of the constituent elements that are substantially identical to those of the right side vehicle headlamp 1R; and therefore, its related description is omitted hereinafter.

(Description of Vehicle headlamp 1R (1L))

The vehicle headlamp 1R (1L) described previously, as shown in FIG. 2, is provided with: a lamp unit 2 for low beam; a lamp unit 3 for high beam; a lamp unit 4 for shoulder edge beam; a swivel device 91; a dimming control portion (refer to a control portion 90 in FIG. 3); a first mount member (a heat sink member) 51 and a second mount member (a bracket) 52; an optical axis adjustment devices 53, 54, and 55; a lamp housing 5; and a lamp lens (such as a through outer lens, for example).

The lamp unit 2 for low beam, the lamp unit 3 for high beam, the lamp unit 4 for shoulder edge beam, the swivel device 91, the dimming control portion, the first mount member 51, the second mount member 52, and the optical axis adjustment devices 53, 54, and 55 are disposed in a lamp room 50 that is partitioned by the lamp housing 5 and the lamp lens. It is to be noted that, although not shown in the lamp room 50, there may be a case in which another lamp unit such as a fog lamp, a cornering lamp, a clearance lamp or a turn signal lamp is disposed. In addition, it is also to be noted that there may be a case in which the dimming control portion is disposed outside of the lamp room 50.

The lamp unit 2 for low beam, the lamp unit 3 for high beam, and the lamp unit 4 for shoulder edge beam are integrally mounted to the first mount member 51. The lamp unit 3 for high beam is disposed inside of the vehicle C (on the left side L in the case of the vehicle headlamp 1R and on the right side in the case of the left side headlamp 1L). The lamp unit 4 for shoulder edge beam is disposed outside of the vehicle C (on the right side R in the case of the right side vehicle headlamp 1R and on the left side L in the case of the left side vehicle headlamp 1L). The lamp unit 2 for low beam is disposed between the lamp unit 3 for high beam and the lamp unit 4 for shoulder edge beam.

(Description of Swivel Device 91)

The swivel device 91 is made of: a drive portion (not shown) and a driving force transmission mechanism (not shown) that are housed in a casing 92; and a rotary shaft 93. By driving the drive portion, a driving force of the drive portion is transmitted to the rotary shaft 93 via the driving force transmission mechanism. As a result, the rotary shaft 93 rotates around a vertical axis V-V (including a substantially vertical axis).

The first mount member 51 is fixed to the rotary shaft 93 of the swivel device 91. The vertical axis V-V of the rotary shaft 93 of the swivel device 91 passes through a center or a substantial center of the lamp unit 2 for low beam. As a result, the lamp unit 2 for low beam, the lamp unit 3 for high beam, and the lamp unit 4 for shoulder edge beam are configured in such a manner as to be integrated with each other and to be rotatable around the vertical axis V-V via the first mount member 51 by means of the swivel device 91.

The swivel device 91 is mounted to the second mount member 52. The second mount member 52 is mounted to the lamp housing 5 via the optical axis adjustment devices 53, 54, and 55.

The swivel device 91 is connected to a control device (not shown) via a camera sensor or a steering angle sensor (no shown), for example. When a detection signal of the steering angle sensor is input to the control device, the control device outputs a control signal to the swivel device 91. As a result, the swivel device 91 is driven to rotate the lamp unit 2 for low beam, the lamp unit 3 for high beam, and the lamp unit 4 for shoulder edge beam around the vertical axis V-V in accordance with left and right swiveling of the vehicle C.

(Description of Optical Adjustment Devices 53, 54, and 55)

The optical axis adjustment devices 53, 54, and 55 are respectively made of: a pivot mechanism (53); top and bottom adjustment screws and screw mounting (54); and left and right adjustment screws and screw mounting (55). As a result, the lamp unit 2 for low beam, the lamp unit 3 for high beam, and the lamp unit 4 for shoulder edge beam are configured in such a manner as to be integrated with each other and to be optically adjustable, by means of the first mount member 51, the swivel device 91, and the second mount member 52.

(Description of Lamp unit 2 for Low Beam)

Figure 4:
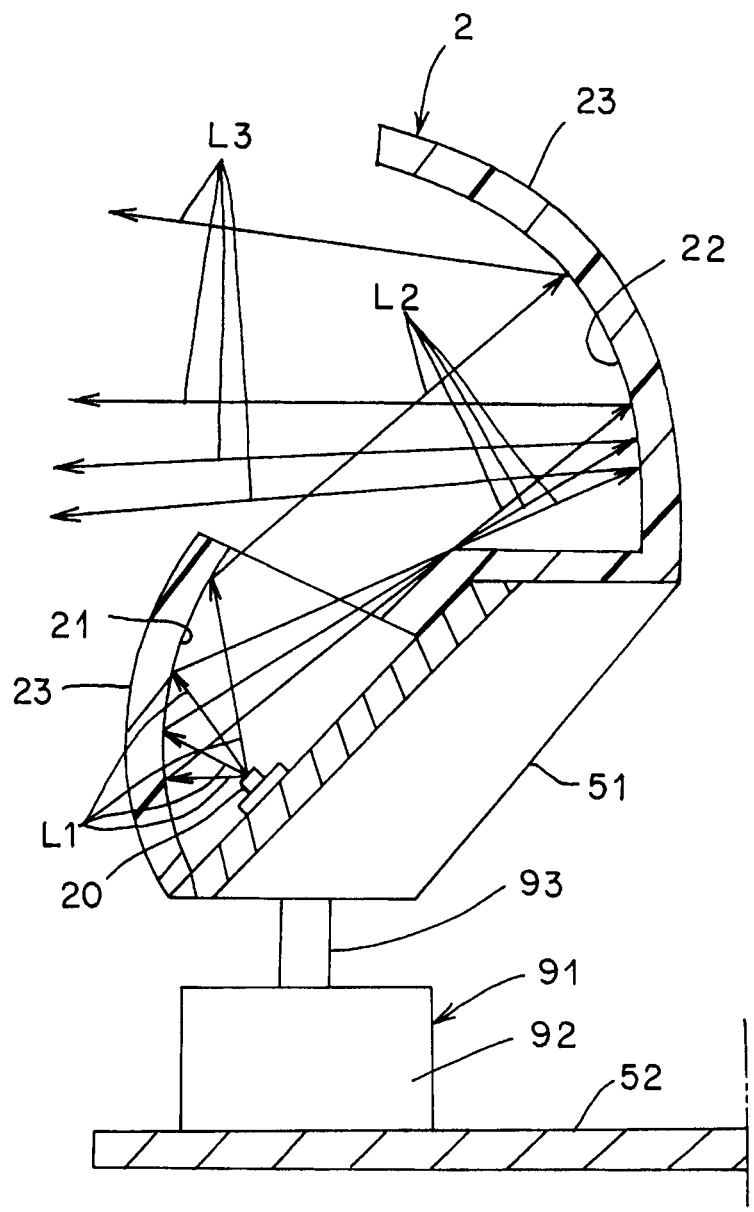
FIG. 4 is a sectional view taken along the line IV-IV in FIG. 2.

The lamp unit 2 for low beam, as shown in FIG. 4, is made of a semiconductor-type light source 20, a reflector 23, and a heat sink member that is compatible with the first mount member 51.

The semiconductor-type light source 20 uses one's own light emitting semiconductor-type light source such as an LED, an EL (an organic EL) (an LED in the exemplary embodiment), for example. The semiconductor-type light source 20 is mounted to the first mount member 51 that is compatible with the heat sink member 51, together with the reflector 23.

The reflector 23 is made of: a first reflection surface 21 that is made of an elliptical reflection surface (a reflection surface made of a free curved surface based on (on the basis of or with reference to) an ellipse, or alternatively, a reflection surface made of a rotational elliptical surface); and a second reflection surface 22 that is made of a parabolic reflection surface (a reflection surface made of a free curved surface based on (on the basis of or with reference to) a parabolic line, or alternatively, a reflection surface made of a rotational parabolic surface).

The first reflection surface 21 is configured to reflect light L1 from the semiconductor-type light source 20 to the side of the second reflection surface 22. The second reflection surface 22 is configured to reflect the reflected light L2 from the first reflection surface 21. The reflected light L3 from the second reflection surface 22 is illuminated forward of the vehicle C, as light distribution patterns for low beam LLP and RLP shown in FIG. 5.

(Description of Light Distribution Patterns for Low Beam LLP and RLP)

Figure 5:
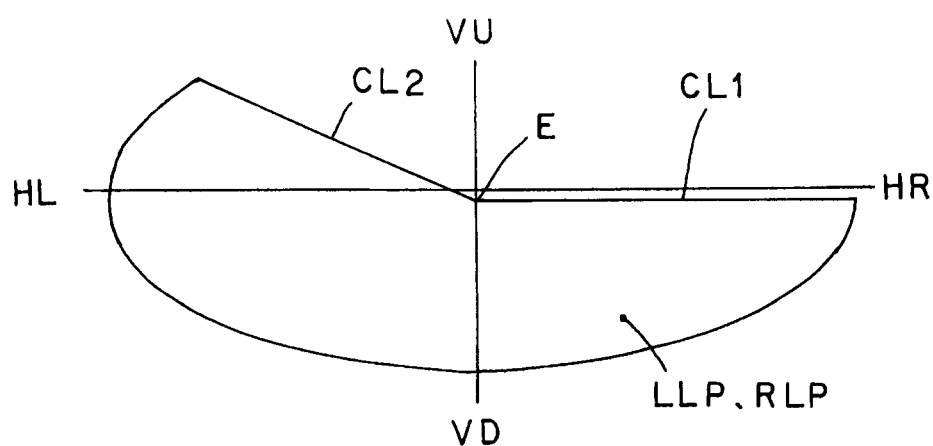
FIG. 5 is an explanatory view showing light distribution patterns for low beam on both of the left and right sides, the light distribution patterns being illuminated from lamp units for low beam on both of the left and right sides forward of the vehicle.

The light distribution pattern for low beam (the light distribution pattern for low beam on the left side) LLP that is illuminated from the lamp unit 2 for low beam of the left side vehicle headlamp 1L to the front side of the vehicle C; and the light distribution pattern for low beam (the light distribution pattern for low beam on the right side) that is illuminated from the lamp unit 2 for low beam of the right side vehicle headlamp 1R to the front side of the vehicle C, as shown in FIG. 5, have: a horizontal cutoff line CL1 that is positioned on the upper right side; a cutoff line CL2 that is obliquely positioned (at an angle of 15 degrees) on the upper left side; and an elbow point E that is positioned at a crossing point between the horizontal cutoff line CL1 and the oblique cutoff line CL2. The horizontal cutoff line CL1 is positioned in such a manner as to be slightly lower than the horizontal line HL-HR on the left to right of the screen.

Figure 10:
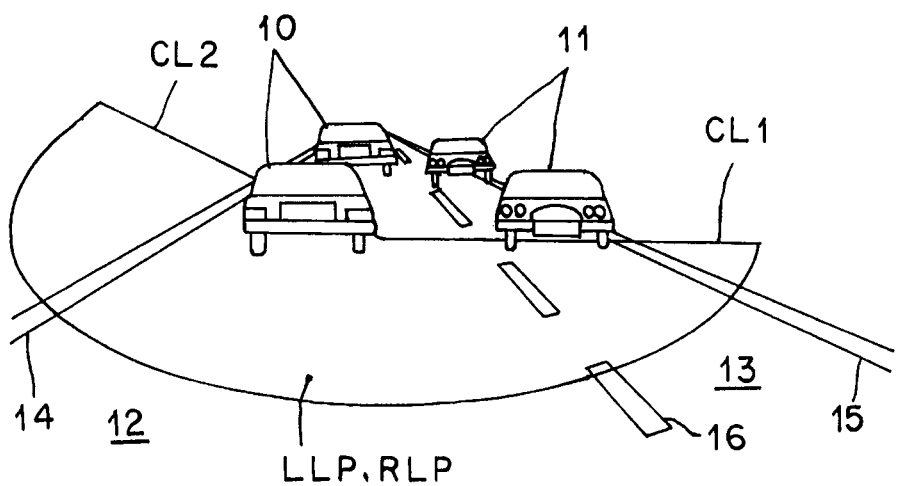
FIG. 10 is an explanatory view showing a road condition (a vehicle Driving condition) when the light distribution patterns for low beam on both of the left and right sides are illuminated forward of the vehicle.

The light distribution patterns for low beam LLP and RLP, as shown in FIG. 10, are mainly configured to scatter and illuminate a front side of a left side driving lane 12 and a right side opposite lane 1 over a wide range. It is to be noted that a Z cutoff line may be employed in place of the oblique cutoff line CL2. It is also noted that reference numeral 16 in FIG. 10 designates a center line.

(Description of Lamp Unit 3 for High Beam)

As is the case with the lamp unit 2 for low beam, the lamp unit 3 for high beam is made of: a semiconductor-type light source (not shown); a reflector; and a heat sink member that is compatible with the first mount member 51. The semiconductor-type light source and the reflector are mounted to the first mount member 51 that is compatible with the heat sink member.

The reflector is made of: a first reflection surface (not shown) that is made of an elliptical reflection surface (a reflection surface made of a free curved surface based on (on the basis of or with reference to) an ellipse, or a reflection surface made of a rotational elliptical surface), second reflection surface rotational elliptical surface and a second reflection surface (not shown) that is made of a parabolic reflection surface (a reflection surface made of a free curved surface based on (on the basis of or with reference to) a parabolic line, or alternatively, a reflection surface made of a rotational parabolic surface).

The first reflection surface is configured to reflect light from the semiconductor-type light source to the side of the second reflection surface. The second reflection surface is configured to reflect the reflected light from the first reflection surface. The reflected light from the second reflection surface is illuminated to the front side of the vehicle C, as light distribution patterns for high beam LHP and RHP shown in FIG. 6.

(Description of Light Distribution Patterns for High Beam LHP and RHP)

Figure 6:
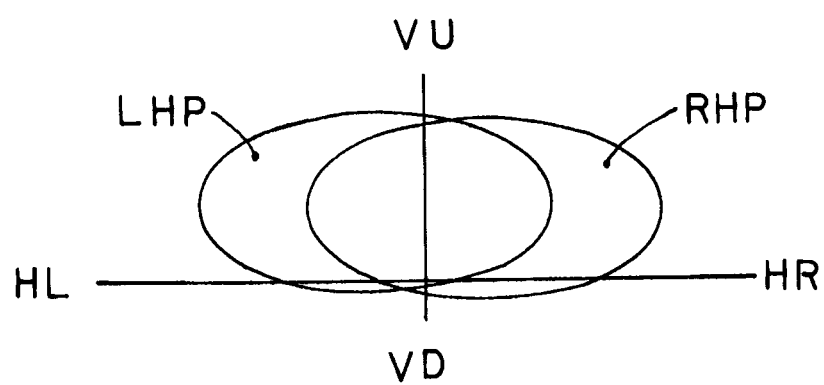
FIG. 6 is an explanatory view showing light distribution patterns for high beam on both of the left and right sides, the light distribution patterns being illuminated from lamp units for high beam on both of the left and right sides forward of the vehicle.

The light distribution pattern for high beam (the light distribution pattern for high beam on the left side) LHP that is illuminated from the lamp unit 3 for high beam of the left side vehicle headlamp 1L to the front side of the vehicle C; and the light distribution pattern for high beam (the light distribution pattern for high beam on the right side) that is illuminated from the lamp unit 3 for high beam of the right side vehicle headlamp 1R to the front side of the vehicle C as shown in FIG. 6, are positioned in such a manner as to be upper than the horizontal line HL-HR from the left to right of a screen and are positioned in such a manner as to be close to the vertical line VU-VD from the top to bottom of the screen.

Figure 11:
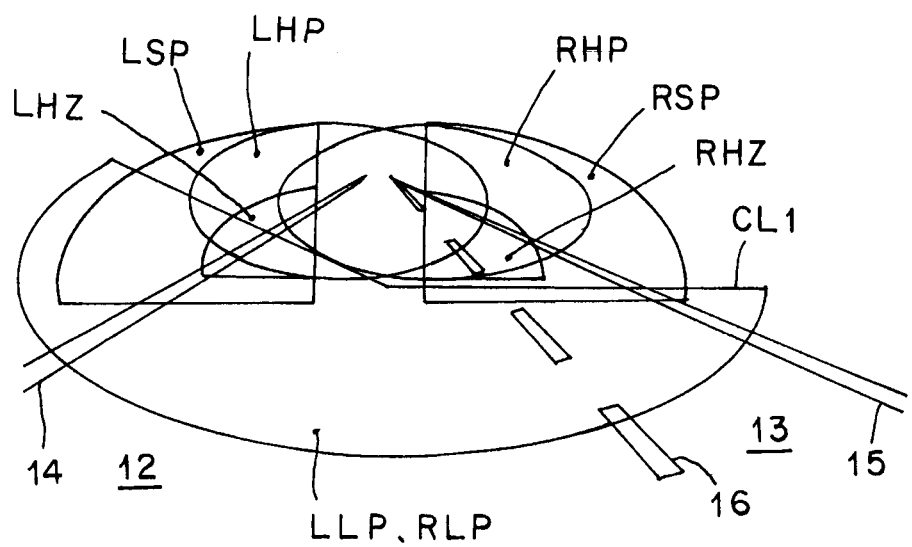
FIG. 11 is an explanatory view showing a road condition (a vehicle Driving condition) when the light distribution patterns for low beam on both of the left and right sides, the light distribution patterns for high beam on both of the left and right sides, and the light distribution patterns for shoulder edge beam on both of the left and right sides are illuminated forward of the vehicle.

The light distribution patterns for high beam LHP and RHP, as shown in FIG. 11, are mainly configured to optically focus and illuminate a distal side of the driving lane 12 and the opposite lane 13.

(Description of Lamp Unit 4 for Shoulder Edge Beam)

As is the case with the lamp unit 2 for low beam and the lamp unit 3 for high beam, the lamp unit 4 for shoulder edge beam is made of: a semiconductor-type light source (not shown); a reflector; and a heat sink member that is compatible with the first mount member 51. The semiconductor-type light source and the reflector are mounted to the first mount member 51 that is compatible with the heat sink member.

The reflector is made of: a first reflection surface that is made of an elliptical reflection surface (a reflection surface made of a free curved surface based on (on the basis of or with reference to) an ellipse), or alternatively, a reflection surface made of a rotational elliptical surface); and a second reflection surface that is made of a parabolic reflection surface (a reflection surface made of a free curved surface based on (on the basis of or with reference to) a parabolic line, or alternatively, a reflection surface made of a rotational parabolic surface).

The first reflection surface is configured to reflect light from the semiconductor-type light source to the side of the second reflection surface. The second reflection surface is configured to reflect the reflected light from the first reflection surface. The reflected light from the second reflection surface is illuminated forward of the vehicle C, as the light distribution patterns for shoulder edge beam LSP and RSP shown in FIG. 7 to FIG. 9.

(Description of Light Distribution Patterns for Shoulder Edge Beam LSP and RSP)

Figure 7:
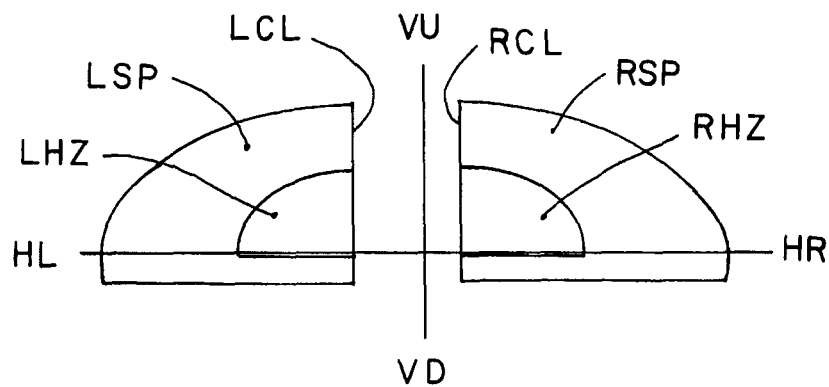
FIG. 7 is an explanatory view showing light distribution patterns for shoulder edge beam on both of the left and right sides, the light distribution patterns being illuminated from lamp units for shoulder edge beam on both of the left and right sides forward of the vehicle.
Figure 8:
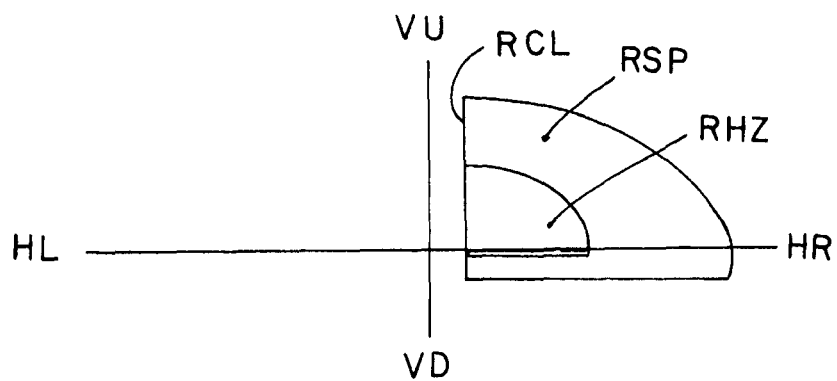
FIG. 8 is an explanatory view showing a light distribution pattern for shoulder edge beam on the right side, the light distribution pattern being illuminated from a lamp unit for shoulder edge beam on the right side forward of the vehicle.
Figure 9:
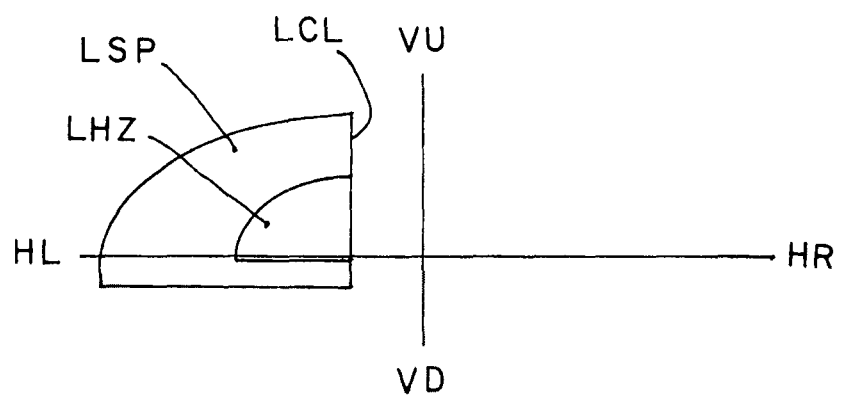
FIG. 9 is an explanatory view showing a light distribution pattern for shoulder edge beam on the left side, the light distribution pattern being illuminated from a lamp unit for shoulder edge beam on the left side forward of the vehicle.

The light distribution pattern for shoulder edge beam (the light distribution pattern for shoulder edge beam on the left side) LSP that is illuminated from lamp unit 4 for shoulder edge beam of the left side vehicle headlamp 1L to the front side of the vehicle C, as shown in FIG. 7 and FIG. 9, has: a vertical cutoff line LCL that is positioned on a center side (the right side); and a hot zone LHZ. The light distribution pattern for shoulder edge beam (the light distribution pattern for shoulder edge beam on the right side) RSP that is illuminated from the lamp unit 4 for shoulder edge beam of the right side vehicle headlamp 1R to the front side of the vehicle C, as shown in FIG. 7 and FIG. 8, has: a vertical cutoff line RCL that is positioned on a center side (the left side); and a hot zone RHZ. A lower side of the hot zones LHZ and RHZ of the light distribution patterns for shoulder edge beam LSP and RSP is positioned on the horizontal line HL-HR from the left to right of the screen or in proximity to its lower side, and a lower side of the light distribution patterns for shoulder edge beam LSP and RSP excluding the hot zones LHZ and RHZ is positioned in such a manner as to be lower than the horizontal line HL-HR from the left to right of the screen.

The light distribution patterns for shoulder edge beam LSP and RSP each are set at 3 degrees or more in height of a longitudinal direction (a vertical direction), and are set at least at 10 degrees in scattering width of a horizontal direction (a transverse direction). The hot zones LHZ and RHZ of the light distribution pattern for shoulder edge beam LSP and RSP are set within 5 degrees in a lateral direction from the vertical cutoff lines LCL and RCL. These hot zones become weaker in luminous intensity as it goes in the lateral direction from the vertical cutoff lines LCL and RCL, each of which has a luminous intensity of 40,000 to 210,000 cd. The light distribution patterns for shoulder edge beam LSP and RSP, as shown in FIG. 11 to FIG. 14, are mainly configured to illuminate a shoulder edge 14 on the driving lane side and a shoulder edge 15 on the opposite lane side.

(Description of Dimming Control Portion)

The dimming control portion is connected to the semiconductor-type light source 20 of the lamp unit 2 for low beam, the semiconductor-type light source of the lamp unit 3 for high beam, and the semiconductor-type light source of the lamp unit 4 for shoulder edge beam (hereinafter, this light source may be solely referred to as a "semiconductor-type light source 20"). The dimming control portion is configured to control dimming of the semiconductor-type light source 20 in order to gradually increase or gradually decrease luminous intensities of the light distribution patterns for low beam LLP and RLP, the light distribution patterns for high beam LHP and RHP, and the light distribution patterns for shoulder edge beam LSP and RSP. Dimming control of the semiconductor-type light source 20 is based on binary notation pulse width modulation, for example, and is carried out by decreasing and increasing a duty ratio of an ON pulse width or a duty ratio of an OFF pulse width.

(Description of Vehicle Headlamp System)

A vehicle headlamp system is provided with: the vehicle headlamps 1L and 1R; a detecting portion 9 configured to detect whether or not a preceding vehicle 10 or an opposite vehicle 11 exists; and a control portion 90 configured to output a control signal to the vehicle headlamps 1 L and 1R, based on a detection signal from the detecting portion 9. The control portion 90 may be compatible with the control device of the swivel device 91.

Figure 12:
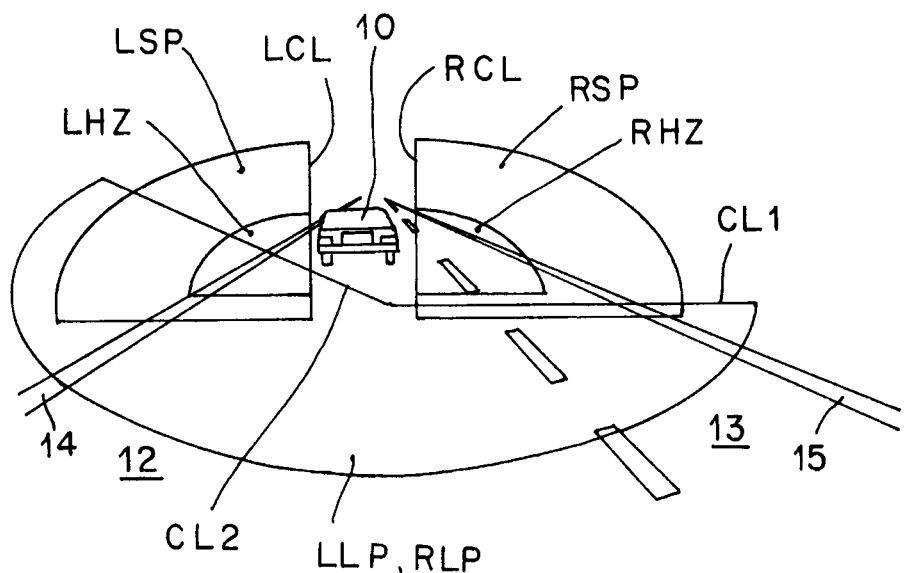
FIG. 12 is an explanatory view showing a road condition (a vehicle Driving condition) when the light distribution patterns for low beam on both of the left and right sides and the light distribution patterns for shoulder edge beam on both of the left and right sides are illuminated forward of the vehicle.
Figure 13:
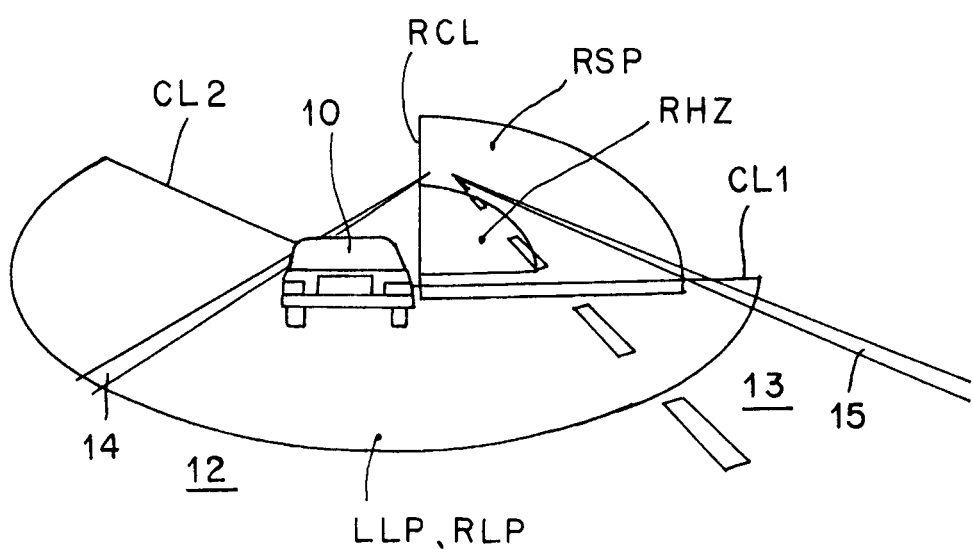
FIG. 13 is an explanatory view showing a road condition (a vehicle Driving condition) when the light distribution patterns for low beam on both of the left and right sides and light distribution pattern for shoulder edge beam on the right side are illuminated forward of the vehicle)
Figure 14:
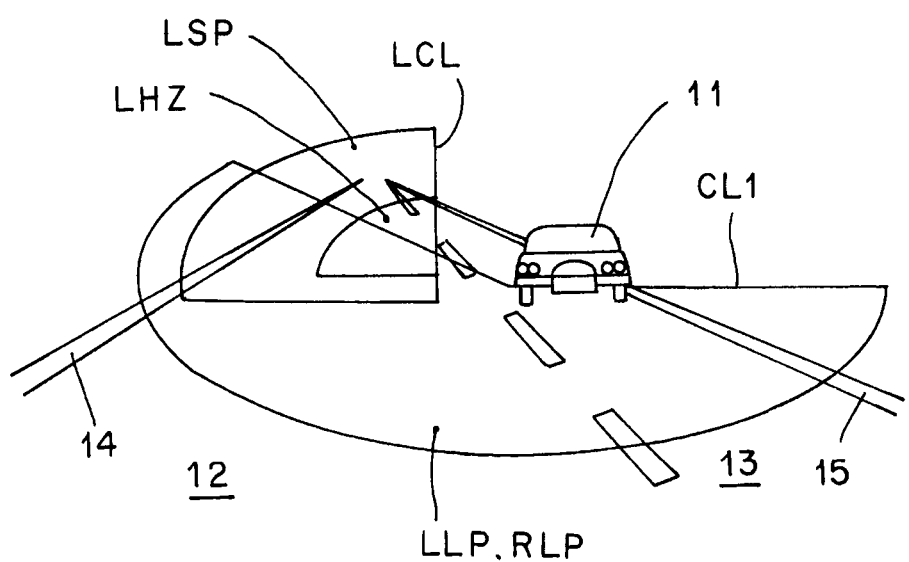
FIG. 14 is an explanatory view showing a road condition (a vehicle Driving condition) when the light distribution patterns for low beam on both of the left and right sides and the light distribution pattern for shoulder edge beam on the left side are illuminated forward of the vehicle.

The detecting portion 9 outputs a first detection signal to the control portion 90 if one or a plurality of preceding vehicles 10 and opposite vehicles 11 exist forward of a driving vehicle, as shown in FIG. 10; outputs a second detection signal to the control portion 90 if neither a preceding vehicle 10 nor an opposite vehicle 11 exists forward of the driving vehicle, as shown in FIG. 11; outputs a third detection signal to the control portion 90 if one or a plurality of forward vehicles 10 is/are distant from the driving vehicle and no opposite vehicle 11 exists forward of a driving vehicle, as shown in FIG. 12; and outputs a fourth detection signal to the control portion 90 if one or a plurality of preceding vehicles 10 approach and no opposite vehicle 11 exists forward of the driving vehicle, as shown in FIG. 13; and outputs a fifth detection signal to the control portion 90 if no preceding vehicle 10 exists or a plurality of opposite vehicles 11 approach and exist forward of a driving vehicle, as shown in FIG. 14. The detecting portion 9 uses a CCD camera, for example.

The control portion 90 is provided with the dimming control portion. The control portion 90 uses an ECU or the like, for example. The control portion 90 outputs a first control signal to the semiconductor-type light source 20 and the swivel device 91 of the vehicle headlamps 1L and 1R by means of the first detection signal from the detecting portion 9;outputs a second control signal to the semiconductor-type light source 20 and the swivel device 91 of the vehicle headlamps 1L and 1R by means of the second detection signal from the detecting portion 9; outputs a third control signal to the semiconductor-type light source 20 and the swivel device 91 of the vehicle headlamps 1L and 1R by means of the third detection signal from the detecting portion 9; outputs a fourth control signal to the semiconductor-type light source 20 and the swivel device 91 of the vehicle headlamps 1L and 1R by means of the fourth detection signal from the detecting portion 9; and outputs a fifth control signal to the semiconductor-type light source 20 and the swivel device 91 of the vehicle headlamps 1L and 1R by means of the fifth detection signal from the detecting portion 9.

The vehicle headlamps 1L and 1R are provided in such a manner that control of turning on or off of the semiconductor-type light source 20 and control of activation or deactivation of the swivel device 91 are carried out by means of the control signal from the control portion 90 based on the detection signal from the detecting portion 9.

In other words, by means of the first control signal from the control portion 90, the semiconductor-type light source 20 of the lamp unit 2 for low beam is controlled in an illuminative state, the semiconductor-type light source of the lamp unit 3 for high beam and the semiconductor-type light source of the lamp unit 4 for shoulder edge beam are controlled in a non-illuminative state, and the swivel device 91 is controlled in an inactive state.

By means of the second control signal from the control portion 90, the semiconductor-type light source 20 (the semiconductor-type light source 20 of the lamp unit 2 for low beam, the semiconductor-type light source of the lamp unit 3 for high beam, and the semiconductor-type light source of the lamp unit 4 for shoulder edge beam) is controlled in an illuminative state, and the swivel device 91 is controlled in an inactive state.

By means of the third control signal from the control portion 90, the semiconductor-type light source 20 of the lamp unit 2 for low beam and the semiconductor-type light source of the lamp unit 4 for shoulder edge beam are controlled in an illuminative state, the semiconductor-type light source of the lamp unit 3 for high beam is controlled in a non-illuminative state, and the swivel device 91 is controlled in an inactive state.

By means of the fourth control signal from the control portion 90, the semiconductor-type light source 20 of the lamp unit 2 for low beam and the semiconductor-type light source of the lamp unit 4 for shoulder edge beam on the right side are controlled in an illuminative state; the semiconductor-type light source of the lamp unit 3 for high beam and the semiconductor-type light source of the lamp unit 4 for shoulder edge beam on the left side are controlled in a non-illuminative state, and the swivel device 91 is controlled in a state in which the swivel device is driven to swivel to the left direction (to the side of the driving lane 12). In this case, at a time point when the swivel device 91 has reached its own left side swivel range, the semiconductor-type light source of the lamp unit 4 for shoulder edge beam on the left side is controlled in a non-illuminative state.

By means of the fifth control signal from the control portion 90, the semiconductor-type light source 20 of the lamp unit 2 for low beam and the semiconductor-type light source of the lamp unit 4 for shoulder edge beam on the left side are controlled in an illuminative state, the semiconductor-type light source of the lamp unit 3 for high beam and the lamp unit 4 for shoulder edge beam on the right side are controlled in a non-illuminative state, and the swivel device 91 is controlled in a state in which the swivel device is driven to rotate to the right side (to the side of the opposite lane 13). In this case, at a time point when the swivel device 91 has reached a right side rotation range, the semiconductor-type light source of the lamp unit 4 for shoulder edge beam on the right side is controlled in a non-illuminative state.

Description of Functions of First Embodiment

The vehicle headlamp system according to the first embodiment (the vehicle headlamps 1L and 1R and the vehicle headlamp device) is made of the constituent elements as described above, and hereinafter, its related functions will be described.

First, as shown in FIG. 10 to FIG. 14, the light distribution patterns for low beam LLP and RLP on both of the left and right sides are illuminated forward of the vehicle C (one's own vehicle in the Description of Functions of First embodiment section) from the lamp units 2 for low beam of the vehicle headlamps 1L and 1R on both of the left and right sides.

Here, as shown in FIG. 10, if one or a plurality of preceding vehicles 10 and opposite vehicles 11 exist forward of the vehicle C, the detecting portion 9 outputs the first detection signal to the control portion 90 and then the control portion 90 outputs the first control signal to the vehicle headlamps 1L and 1R and the swivel device 91. Afterwards, the semiconductor-type light source 20 of the lamp unit 2 for low beam is controlled in an illuminative state, the semiconductor-type light source of the lamp unit 3 for high beam and the semiconductor-type light source of the lamp unit 4 for shoulder edge beam are controlled in a non-illuminative state, and the swivel device 91 is controlled in an inactive state.

Therefore, as shown in FIG. 10, only the light distribution patterns for low beam LLP and RLP on both of the left and right sides are illuminated forward of the vehicle C from the lamp units 2 for low beam of the vehicle headlamps 1L and 1R on both of the left and right sides. As a result, by means of the light distribution patterns for low beam LLP and RLP on both of the left and right sides, the front sides of the driving lane 12 and the opposite lane 13 can be illuminated over a wide range. On the other hand, by means of the horizontal cutoff lines CL1 and the oblique cutoff line CL2 of the light distribution patterns for low beam LLP and RLP on both of the left and right sides, there can hardly occur a case in which nuisance light to one or a plurality of preceding vehicles 10 and opposite vehicles 11 forward of the vehicle C, making it possible to contribute to safe driving.

Herein, as shown in FIG. 11, if no preceding vehicle 10 and opposite vehicle 11 exist forward of the vehicle C, the detecting portion 9 outputs the second detection signal to the control portion 90 and then the control portion 90 outputs the second control signal to the vehicle headlamps 1L and 1R and the swivel device 91. Afterwards, the semiconductor-type light source 20 (the semiconductor-type light source 20 of the lamp unit 2 for low beam, the semiconductor-type light source of the lamp unit 3 for high beam, and the semiconductor-type light source of the lamp unit 4 for shoulder edge beam) is controlled in an illuminative state, and the swivel device 91 is controlled in an inactive state.

Therefore, as shown in FIG. 11, those which are illuminated forward of the vehicle C are the light distribution patterns for low beam LLP and RLP on both of the left and right sides from the lamp units 2 for low beam of the vehicle headlamps 1L and 1R on both of the left and right sides; the light distribution patterns for high beam LHP and RHP on both of the left and right sides from the lamp units 3 for high beam of the vehicle headlamps 1L and 1R on both of the left and right sides; and light distribution patterns for shoulder edge beam LSP and RSP on both of the left and right sides from the lamp units 4 for shoulder edge beam of the vehicle headlamps 1L and 1R on both of the left and right sides. As a result, by means of the light distribution patterns for low beam LLP and RLP on both of the left and right sides, the light distribution patterns for high beam LHP and RHP on both of the left and right sides, and the light distribution patterns for shoulder edge beam LSP and RSP on both of the left and right sides, the front sides and distal sides of the driving lane 12 and the opposite lane 13 and further the shoulder edge 14 of the driving lane side and the shoulder edge 15 of the opposite lane side can be illuminated over a wide range, making it possible to contribute to safe driving.

Here, a lower side of the horizontal cutoff line CL1 of the light distribution patterns for low beam LLP and RLP on both of the left and right sides and a lower side of the light distribution pattern for shoulder edge beam RSP on the right side excluding the hot zone RHZ overlap on each other. Therefore, in an overlap portion between the light distribution patterns for low beam LLP and RLP and the light distribution pattern for shoulder edge beam RSP on the right side, there can hardly occur a case in which a line of intense light or a line of missing of light is generated. As a result, a visual recognition property in this overlap portion is improved, making it possible to contribute to safe driving.

Subsequently, as shown in FIG. 12, if one or a plurality of preceding vehicles 10 is/are distant and no opposite vehicle 11 exists forward of the vehicle C, the detecting portion 9 outputs the third detection signal to the control portion 90 and then the control portion 90 outputs the third control signal to the vehicle headlamps 1L and 1R and the swivel device 91. Afterwards, the semiconductor-type light source 20 of the lamp unit 2 for low beam and the semiconductor-type light source of the lamp unit 4 for shoulder edge beam are controlled in an illuminative state, the semiconductor-type light source of the lamp unit 3 for high beam is controlled in a non-illuminative state, and the swivel device 91 is controlled in an inactive state.

Therefore, as shown in FIG. 12, those which are illuminated forward of the vehicle C are the light distribution patterns for low beam LLP and RLP on both of the left and right sides from the lamp units 2 for low beam of the vehicle headlamps 1L and 1R on both of the left and right sides; and the light distribution patterns for shoulder edge beam LSP and RSP on both of the left and right sides from the lamp units 4 for shoulder edge beam of the vehicle headlamps 1L and 1R. As a result, by means of the light distribution patterns for low beam LLP and RLP on both of the left and right sides, the front sides of the driving lane 12 and the opposite lane 13 can be illuminated over a wide range, and by means of the light distribution patterns for shoulder edge beam LSP and RSP on both of the left and right sides, the shoulder edge 14 of the driving lane side and the shoulder edge 15 of the opposite lane side can be illuminated. On the other hand, by means of the oblique cutoff line CL2 of the light distribution patterns for low beam LLP and RLP on both of the left and right sides and the vertical cutoff lines LCL and RCL of the light distribution patterns for shoulder edge beam LSP and RSP on both of the left and right sides, there can hardly occur a case in which nuisance light is imparted to one or a plurality of preceding vehicles 10 forward of the vehicle C, making it possible to contribute to safe driving.

Here, in an overlap portion between a lower side of the horizontal cutoff line CL1 of the light distribution patterns for low beam LLP and RLP on both of the left and right sides and a lower side of the light distribution pattern for shoulder edge beam RSP on the right side excluding the hot zone RHZ, there can hardly occur a case in which a line of intense light or a line of missing of light is generated. As a result, the visual recognition property in this overlap portion is improved, making it possible to contribute to safe driving.

In addition, as shown in FIG. 13, if one or a plurality of preceding vehicles 10 approach and no opposite vehicle 11 exists forward of the vehicle C, the detecting portion 9 outputs the fourth signal to the control portion 90 and then the control portion 90 outputs the fourth control signal to the vehicle headlamps 1L and 1R and the swivel device 91. Afterwards, the semiconductor-type light source 20 of the lamp unit 2 for low beam and the semiconductor-type light source of the lamp unit 4 for shoulder edge beam on the right side are controlled in an illuminative state, the semiconductor-type light source of the lamp unit 3 for high beam and the semiconductor-type light source of the lamp unit 4 for shoulder edge beam on the left side are controlled in a non-illuminative state, and the swivel device 91 is controlled in a state in which the swivel device is driven to swivel to the left side (to the side of the driving lane 12). Here, at a time point when the swivel device 91 has reached its own left side swivel range, the semiconductor-type light source of the lamp unit 4 for shoulder edge beam on the left side is controlled in a non-illuminative state.

Therefore, as shown in FIG. 13, those which are illuminated forward of the vehicle C are the light distribution patterns for low beam LLP and RLP on both of the left and right sides from the lamp units 2 for low beam of the vehicle headlamps 1L and 1R on both of the left and right sides; and the light distribution pattern for shoulder edge beam RSP on the right side from the lamp unit 4 for shoulder edge beam of the vehicle headlamp 1R on the right side, and the light distribution patterns for low beam LLP and RLP on both of the left and right sides and the light distribution pattern for shoulder edge beam RSP on the right side are distributed to the left side. As a result, by means of the light distribution patterns for low beam LLP and RLP on both of the left and right sides, the light distributed patterns being distributed to the left side, the front sides of the driving lane 12 and the opposite lane 13 and the shoulder edge 14 of the driving lane side can be illuminated over a wide range, and by means of the light distribution pattern for shoulder edge beam RSP on the right side that is distributed to the left side, the right side of the driving lane 12 and the distal side of the opposite lane 13 can be illuminated. On the other hand, by the oblique cutoff line CL2 of the light distribution patterns for low beam LLP and RLP on both of the left and right sides, the light distribution patterns being distributed to the left side, and the vertical cutoff line RCL of the light distribution pattern for shoulder edge beam RSP on the right side that is distributed to the left side, there can hardly occur a case in which nuisance light is imparted to one or a plurality of preceding vehicles 10 approaching forward of the vehicle C, making it possible to contribute to safe driving.

Here, in an overlap portion between a lower side of the horizontal cutoff line CL1 of the light distribution patterns for low beam LLP and RLP on both of the left and right sides and a lower side of the light distribution pattern for shoulder edge beam RSP on the right side excluding the hot zone RHZ, there can hardly occur a case in which a line of intense light or a line of missing of light is generated. As a result, the visual recognition property in this overlap portion is improved, making it possible to contribute to safe driving.

In addition, as shown in FIG. 14, if no forward preceding vehicle 10 exists and one or a plurality of opposite vehicles 11 approaches forward of the vehicle C, the detecting portion 9 outputs the fifth detection signal to the control portion 90 and then the control portion 90 outputs the fifth control signal to the vehicle headlamps 1L and 1R and the swivel device 91. Afterwards, the semiconductor-type light source 20 of the lamp unit 2 for low beam and the semiconductor-type light source of the lamp unit 4 for shoulder edge beam on the left side are controlled in an illuminative state, the semiconductor-type light source of the lamp unit 3 for high beam and the semiconductor-type light source of the lamp unit 4 for shoulder edge beam on the right side are controlled in a non-illuminative state, and the swivel device 91 is controlled in a state in which the swivel device is driven to swivel to the right side (to the side of the opposite lane 13). Here, at a time when the swivel device 91 has reached its own right side swivel range, the semiconductor-type light source of the lamp unit 4 for shoulder edge beam on the right side is controlled in a non-illuminative state.

Therefore, as shown in FIG. 14, those which are illuminated forward of the vehicle C are the light distribution patterns for low beam LLP and RLP on both of the left and right sides from the lamp units 2 for low beam of the vehicle headlamps 1L and 1R on both of the left and right sides; and the light distribution pattern for shoulder edge beam LSP on the left side from the lamp unit 4 for shoulder edge beam of the vehicle headlamp 1L on the left side, and those which are distributed to the right side are the light distribution patterns for low beam LLP and RLP on both of the left and right sides; and the light distribution pattern for shoulder edge beam LSP on the left side. As a result, by means of the light distribution patterns for low beam LLP and RLP on both of the left and right sides, the light distribution patterns being distributed to the right side, the front sides of the driving lane 12 and the opposite lane 13 and the shoulder edge 15 on the opposite lane side can be illuminated over a wide range, and by means of the light distribution pattern for shoulder edge beam LSP on the left side that is distributed to the right side, the distal sides of the driving lane 12 and the opposite lane 13 and the shoulder edge 14 of the driving lane side can be illuminated. On the other hand, by means of the horizontal cutoff line CL1 of the light distribution patterns LLP and RLP on both of the left and right sides, the light distribution patterns being distributed to the right side, and the vertical cutoff line LCL of the light distribution pattern for shoulder edge LSP on the left side, the light distribution pattern being distributed to the right side, there can hardly occur a case in which nuisance light is imparted to one or a plurality of opposite vehicles 11 approaching forward of the vehicle C, making it possible to contribute to safe driving.

Each of FIG. 10 to FIG. 14 is an explanatory view of a case of a straight route. In the case of a curved route, the light distribution patterns for low beam LLP and RLP on both of the left and right sides; the light distribution patterns for high beam LHP and RHP on both of the left and right sides; and the light distribution patterns for shoulder edge beam LSP and RSP on both of the left and right sides are distributed in a horizontal direction (in a transverse direction) in accordance with left and right steering swiveling of the vehicle C.

Description of Advantageous Effects of First Embodiment

The vehicle headlamp system according to the first embodiment (the vehicle headlamps 1L and 1R and the vehicle headlamp device) are made of the constituent elements and functions as described above, and hereinafter, its related advantageous effects will be described.

The vehicle headlamp system according to the first embodiment uses lamp units of a reflector reflection and light distribution type as the lamp units 2 for low beam on both of the left and right sides, the lamp units 3 for high beam on both of the left and right sides, and the lamp units 4 for shoulder edge beam on both of the left and right sides. Thus, light L1 from the semiconductor-type light source 20 can be effectively utilized in comparison with a lamp unit of a projector type. In addition, a light distribution design configured to form the light L1 from the semiconductor-type light source 20 in predetermined light distribution patterns (the light distribution patterns for low beam LLP and RLP on both of the left and right sides, the light distribution patterns for high beam LHP and RHP on both of the left and right sides, and the light distribution patterns for shoulder edge beam LSP and RSP on both of the left and right sides) by means of the first reflection surface 21 and the second reflection surface 22 of the reflector 23 is simplified in comparison with a lamp unit of a lens direct emission and light distribution type.

Moreover, the vehicle headlamp system according to the first embodiment is provided in such a manner that multifunctional light distribution patterns (multifunctional light distribution patterns that are obtained by using a combination of the light distribution patterns for low beam LLP and RLP on both of the left and right sides, the light distribution patterns for high beam LHP and RHP on both of the left and right sides, and the light distribution patterns for shoulder edge beam LSP and RSP on both of the left and right sides) can be obtained by turning on or off the semiconductor-type light sources 20 of the lamp units 2 for low beam on both of the left and right sides, turning on or off the semiconductor-type light sources of the lamp units 3 for high beam on both of the left and right sides, and turning on or off the semiconductor-type light sources 4 for shoulder edge beam on both of the left and right sides.

The vehicle headlamp system according to the first embodiment is provided in such a manner that multifunctional light distribution patterns can be distributed in a horizontal direction (in a transverse direction) by means of the swivel device 91; and therefore, further multifunctional light distribution patterns can be obtained. In addition, the light distribution patterns for low beam LLP and RLP on both of the left and right sides can be distributed in a horizontal direction; and therefore, the visual recognition property in a swivel direction at the time of driving on a curved route (a curve) can be enhanced, making it possible to contribute to safe driving.

The vehicle headlamp system according to the first embodiment is provided in such a manner that the vertical axis V-V of the rotary shaft 93 of the swivel device 91 passes through a center or a substantial center of the lamp unit 2 for low beam; and therefore, when the light distribution patterns for low beam LLP and RLP on both of the left and right sides are distributed in a horizontal direction by means of the swivel device 91, deformation of the light distribution patterns for low beam LLP and RLP on both of the left and right sides can be reduced to their required minimum levels.

Description of Second Embodiment

Figure 15:
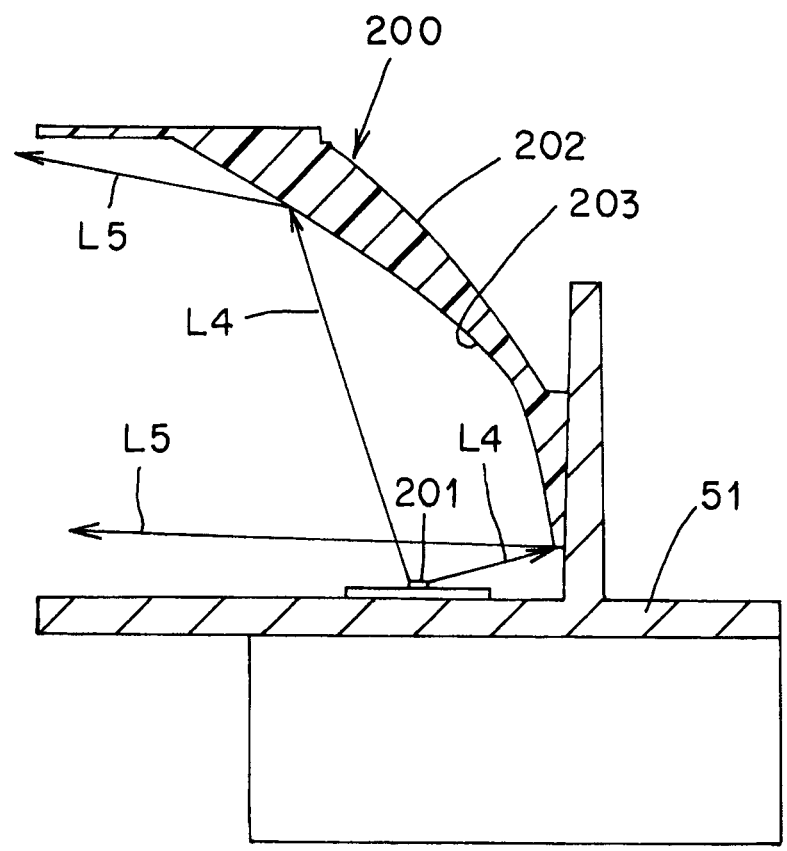
FIG. 15 is a vertical sectional view (a longitudinal sectional view or a sectional view that corresponds to that of FIG. 4) of a lamp unit for low beam showing a second embodiment of a vehicle headlamp system according to the present invention.

FIG. 15 shows a second embodiment of a vehicle headlamp according to the present invention. Hereinafter, the vehicle headlamp in the second embodiment will be described. In the figure, like constituent elements are designated by like reference numerals in FIG. 1 to FIG. 14.

The vehicle headlamps 1L and 1R of the first embodiment described previously, as shown in FIG. 4, use the lamp units (the lamp units 2 for low beam on both of the left and right sides, the lamp units 3 for high beam on both of the left and right sides, and the lamp units 4 for shoulder edge beam on both of the left and right sides), each of which is made of the semiconductor-type light source 20 and the reflector 23 that has the first reflection surface 21 and the second reflection surface 22. On the other hand, the vehicle headlamps of the second embodiment, as shown in FIG. 15, use lamp units (lamp units 200 for low beam on both of the left and right sides, lamp units for high beam on both of the left and right sides, and lamp units for shoulder edge beam on both of the left and right sides), each of which is made of a semiconductor-type light source 201 and a reflector 202 that has a reflection surface 203. The reflection surface 203 is configured to reflect light L4 from the semiconductor-type light source 201 and then form, by means of the reflected light L5, predetermined light distribution patterns (light distribution patterns for low beam LLP and RLP on both of the left and right sides, light distribution patterns for high beam LHP and RHP on both of the left and right sides, and light distribution patterns for shoulder edge beam LSP and RSP on both of the left and right sides).

The vehicle headlamps in the second embodiment are capable of achieving functions and advantageous effects that are substantially identical to those of the vehicle headlamps 1L and 1R in the first embodiment described previously. In particular, the vehicle headlamps of the second embodiment respectively are small in size in comparison with the vehicle headlamps 1L and 1R in the first embodiment described previously; and therefore, the vehicle headlamps are suitable in a case where they are installed in a small space.

Description of Examples Other than First and Second Embodiments

The first and second embodiments have described the vehicle headlamps 1L and 1R in a case where the vehicle C is configured to travel on the left side. However, the present invention can also be applied to a vehicle headlamp in a case where the vehicle C is configured to travel on the right side.

In addition, in the first and second embodiments, multifunctional light distribution patterns are distributed in a horizontal direction (in a transverse direction) by means of the swivel device 91. However, in the present invention, there may be a configuration in such a manner that there is no need to provide the swivel device 91, and such multifunctional light distribution patterns does not need to be distributed in the horizontal direction (in the transverse direction).

Further, in the first and second embodiments, the vertical axis V-V of the rotary shaft 93 of the swivel device 91 passes through a center or a substantial center of the lamp unit 2 for low beam. However, in the present invention, there may be a configuration in such a manner that the vertical axis V-V of the rotary shaft 93 of the swivel device 91 passes through a location other than the center or the substantial center of the lamp unit 2 for low beam.

Furthermore, in the first and second embodiments, the lamp unit 3 for high beam are disposed inside of the vehicle C, the lamp unit 4 for shoulder edge beam is disposed outside of the vehicle C, and the lamp unit 2 for low beam is disposed between the lamp unit 3 for high beam and the lamp unit 4 for shoulder edge beam. However, in the present invention, there may be a configuration in such a manner that the lamp unit 3 for high beam is disposed inside of the vehicle C, the lamp unit 4 for shoulder edge beam is disposed outside of the vehicle C in which the lamp unit 3 for high beam has been disposed, and the lamp unit 2 for low beam is disposed outside of the vehicle C from which the lamp unit 4 for shoulder edge beam has been disposed outside.

Still furthermore, in the first and second embodiments, the light distribution patterns for low beam LLP and RLP on both of the left and right sides, the light distribution patterns for high beam LHP and RHP on both of the left and right sides, and the light distribution patterns for shoulder edge beam LSP and RSP on both of the left and right sides are controlled so to be dimmed by means of the dimming control portion of the control portion 90. However, in the present invention, there may be a configuration in such a manner that an arbitrary light distribution pattern only is controlled so as to be dimmed from among the light distribution patterns for low beam LLP and RLP on both of the left and right sides, the light distribution patterns for high beam LHP and RHP on both of the left and right sides, and the light distribution patterns for shoulder edge beam LSP and RSP on both of the left and right sides without a need to control other light distributions to be dimmed, or alternatively, there may be a configuration in such a manner that there is no need to control dimming of all of the light distribution patterns.

What is claimed is:

1. A vehicle headlamp comprising:
a lamp unit for low beam configured to illuminate a light distribution pattern for low beam forward of a vehicle;
a lamp unit for high beam configured to illuminate a light distribution pattern for high beam forward of the vehicle; and
a lamp unit for shoulder edge beam configured to illuminate a light distribution pattern for shoulder edge beam forward of the vehicle, wherein
the lamp unit for low beam, the lamp unit for high beam, and the lamp unit for shoulder edge beam each are made of a semiconductor-type light source and a reflector having a reflection surface configured to illuminate light from the semiconductor-type light source forward of the vehicle without the light from the semiconductor-type light source passing through a projection lens, as the light distribution pattern for low beam, the light distribution pattern for high beam, and the light distribution pattern for shoulder edge beam, respectively.

2. The vehicle headlamp according to claim 1, wherein the lamp unit for low beam, the lamp unit for high beam, and the lamp unit for shoulder edge beam are configured so as to be integrated with each other and to be rotatable around a vertical shaft by means of a swivel device.

3. The vehicle headlamp according to claim 2, wherein a vertical shaft of the swivel device passes through a center or a substantial center of the lamp unit for low beam.

4. A vehicle headlamp device comprising:
a vehicle headlamp according to claims 1;
a detecting portion configured to detect whether or not a preceding vehicle or an opposite vehicle exists; and
a control portion configured to output a control signal to a semiconductor-type light source or the semiconductor-type light source and a swivel device, based on a detection signal from the detecting portion.

* * * * *